United States Patent
Tatsumi et al.

(10) Patent No.: US 8,737,412 B2
(45) Date of Patent: May 27, 2014

(54) NETWORK RELAY SYSTEM AND METHOD OF AUTOMATICALLY SETTING A NETWORK RELAY SYSTEM

(75) Inventors: Tomoyoshi Tatsumi, Tsuchiura (JP); Shingo Sugawara, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 75 days.

(21) Appl. No.: 13/303,824

(22) Filed: Nov. 23, 2011

(65) Prior Publication Data
US 2012/0128005 A1    May 24, 2012

(30) Foreign Application Priority Data

Nov. 24, 2010  (JP) .................................. 2010-261377
Sep. 26, 2011  (JP) .................................. 2011-208440

(51) Int. Cl.
  *H04L 12/28*  (2006.01)
  *H04L 12/54*  (2013.01)
  *H04L 12/56*  (2006.01)

(52) U.S. Cl.
  CPC ............... *H04L 12/56* (2013.01); *H04L 49/15* (2013.01); *H04L 49/356* (2013.01)
  USPC ............ 370/401; 370/386; 370/392; 370/360

(58) Field of Classification Search
  CPC ....... H04L 45/245; H04L 49/00; H04L 49/15; H04L 49/356
  See application file for complete search history.

(56) References Cited

U.S. PATENT DOCUMENTS

| 6,058,116 A | 5/2000 | Hiscock et al. |
| 6,195,349 B1 | 2/2001 | Hiscock et al. |
| 7,139,267 B2 | 11/2006 | Lu et al. |
| 2008/0240133 A1 | 10/2008 | Tanaka |
| 2010/0265849 A1* | 10/2010 | Harel ........................... 370/256 |
| 2010/0316053 A1 | 12/2010 | Miyoshi et al. |
| 2011/0080855 A1* | 4/2011 | Fung ............................ 370/256 |
| 2012/0057590 A1* | 3/2012 | Shiraki ........................ 370/359 |
| 2012/0127853 A1 | 5/2012 | Tatsumi et al. |

FOREIGN PATENT DOCUMENTS

| JP | 2007-189476 A | 7/2007 |
| JP | 2009-290271 A | 12/2009 |
| JP | 2010-288168 A | 12/2010 |

OTHER PUBLICATIONS

U.S. Appl. No. 13/303,945; First Named Inventor: Tomoyoshi Tatsumi; Title: "Network Relay System and Method of Controlling a Network Relay System"; filed Nov. 23, 2011.

* cited by examiner

*Primary Examiner* — David Oviessi
(74) *Attorney, Agent, or Firm* — Holtz Holtz Goodman & Chick PC

(57) ABSTRACT

FSs (16a to 16h) are each connected to IFSs (14a to 14x). Each of the FSs (16a to 16h) transmits a setting frame (60) that includes an FS number to the connected IFSs (14a to 14x). Each of the IFSs (14a to 14x) registers, in an LAG setting table, the FS numbers included in the received setting frames (60) and ports that have received the same in association with each other. Then, each of the IFSs (14a to 14x) sorts ports (52a to 52h) in an order of the associated FS numbers, and sets each of LAGs (18a to 18x) in a common order.

8 Claims, 13 Drawing Sheets

Fig.7

| TRANSMISSION SOURCE FS NUMBER | LAG ASSIGNED PORT | LAG D |
|---|---|---|
| 1 | 52c | 100 |
| 2 | 52e | |
| 3 | 52b | |
| 4 | 52d | |
| 5 | 52a | |
| 6 | 52h | |
| 7 | 52g | |
| 8 | 52f | |

Fig.12

| TRANSMISSION SOURCE IFS NUMBER | LAG ASSIGNED PORT | LAG ID |
|---|---|---|
| 1 | 46c | 101 |
| 1 | 46e | |
| 2 | 46b | 102 |
| 2 | 46d | |
| 3 | 46a | 103 |
| 3 | 46h | |
| ⋮ | ⋮ | ⋮ |
| 24 | 46y | 124 |
| 24 | 46z | |

Fig.13

| TRANSMISSION SOURCE FS NUMBER | LAG ASSIGNED PORT | LAG ID |
|---|---|---|
| 1 | 52c | |
| 1 | 52e | |
| 2 | 52b | |
| 2 | 52d | 100 |
| ⋮ | ⋮ | |
| 8 | 52g | |
| 8 | 52f | |

NETWORK RELAY SYSTEM AND METHOD OF AUTOMATICALLY SETTING A NETWORK RELAY SYSTEM

BACKGROUND OF THE INVENTION

1. Field of the Invention

The present invention relates to a network relay system and a method of automatically setting a network relay system.

2. Description of the Related Art

Up to now, there is known a system in which a first network relay apparatus group including a plurality of network relay apparatuses functions as a fabric node and a second network relay apparatus group including a plurality of network relay apparatuses functions as a line node (see, for example, FIG. 8 of Japanese Patent Application Laid-open No. 2009-290271).

With a conventional technology, it is conceivable to provide, for example, a technology for setting a link aggregation group (hereinafter, abbreviated as "LAG") for a plurality of physical lines that connect a network relay apparatus belonging to the second network relay apparatus group and a plurality of network relay apparatuses belonging to the first network relay apparatus group to each other. However, up to now, there is a problem that a workload in setting the LAG becomes heavier as the number of network relay apparatuses increases.

SUMMARY OF THE INVENTION

The present invention provides a technology capable of automatically setting an LAG in a network relay system including a plurality of interface switches and a plurality of fabric switches connected to the plurality of interface switches.

According to a first aspect of the present invention, there is provided a network relay system, including: a plurality of interface switches; and a plurality of fabric switches connected to the plurality of interface switches. The plurality of fabric switches each include a first setting frame transmitter for transmitting a first setting frame that includes first identification information to the plurality of interface switches, and the plurality of interface switches each include a first LAG setter for setting a link aggregation group for ports that have received the first setting frame, in accordance with an order of arrangement based on the first identification information.

Further, according to a second aspect of the present invention, there is provided a method of automatically setting a network relay system, the network relay system including: a plurality of interface switches; and a plurality of fabric switches connected to the plurality of interface switches. The method includes: transmitting, by each of the plurality of fabric switches, a first setting frame that includes first identification information to the plurality of interface switches; and setting, by each of the plurality of interface switches, a link aggregation group for ports that have received the first setting frame, in accordance with an order of arrangement based on the first identification information.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings:

FIG. 7 is a diagram illustrating a structure of an LAG setting table set according to Operation Example 1;

FIG. 12 is a diagram illustrating a structure of an LAG setting table set in the FS according to Operation Example 2; and FIG. 13 is a diagram illustrating a structure of an LAG setting table set in the IFS according to Operation Example 2.

DETAILED DESCRIPTION

Hereinafter, an embodiment of the present invention is described with reference to the accompanying drawings.

Figure 1:
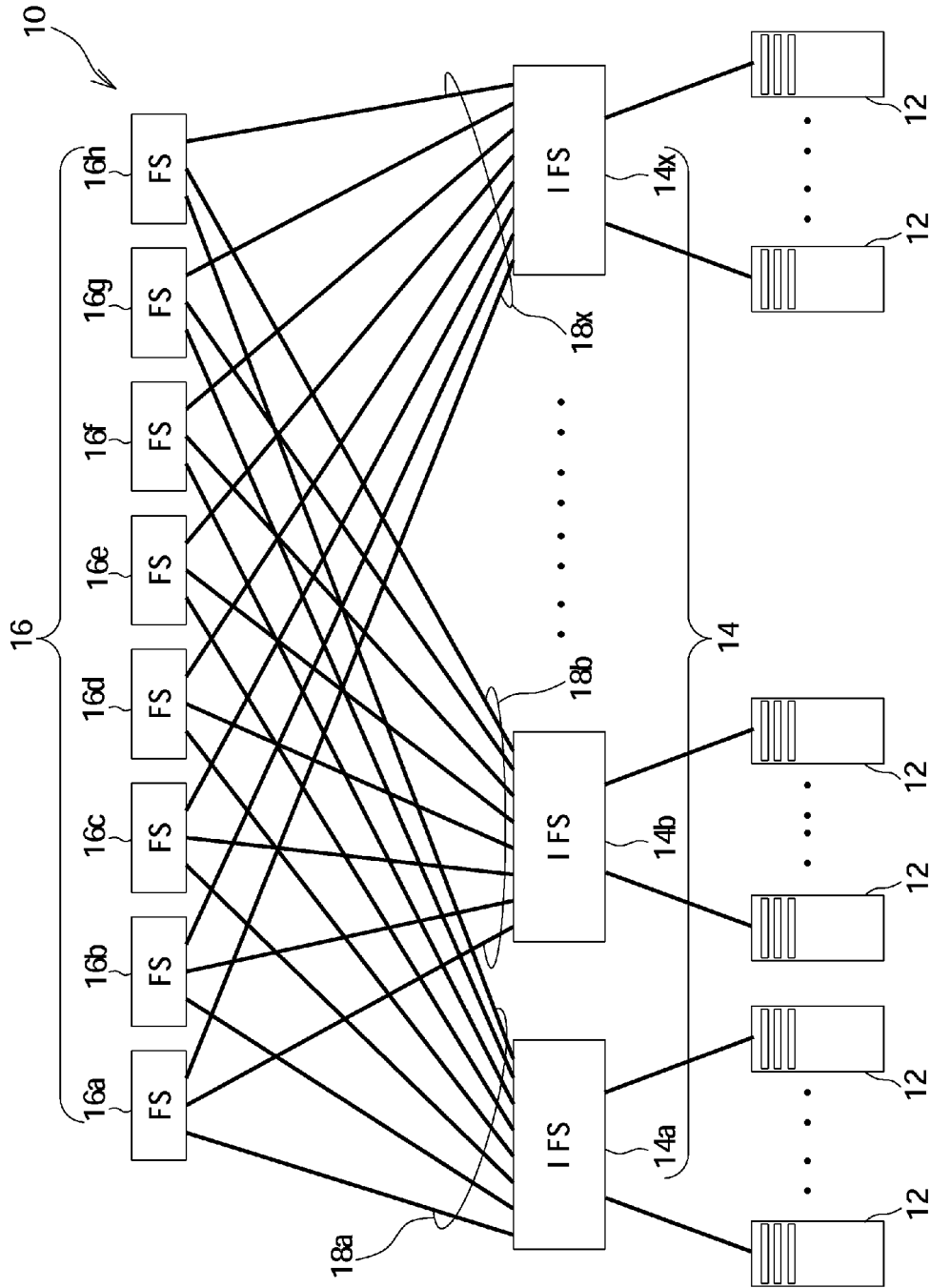
FIG. 1 is a diagram schematically illustrating a structural example of a network relay system.

FIG. 1 is a diagram schematically illustrating a structural example of a network relay system 10 according to one embodiment. The network relay system 10 is suitable for the purpose of, for example, relaying a network frame that is transmitted/received between a plurality of terminal devices 12 inside the facility such as a data center. The terminal device 12 is, for example, a server or a network switch. Note that, the present invention is not limited to the number or type of connected terminal devices 12.

The network relay system 10 includes a plurality of interface switches, for example, approximately twenty-four interface switches (IFSs) 14a, 14b, . . . , and 14x. Further, the network relay system 10 includes a plurality of fabric switches, for example, eight fabric switches (FSs) 16a to 16h. Note that, the number of IFSs 14a to 14x and the number of FSs 16a to 16h mentioned here are merely an example, to which the present invention is not limited.

Further, hereinafter, the "IFSs 14a to 14x" serving as the interface switches may be referred to as "IFSs 14", and the "FSs 16a to 16h" serving as the fabric switches may be referred to as "FSs 16".

In this embodiment, for example, box-type switching hubs are used as the IFSs 14a to 14x and the FSs 16a to 16h. The switching hub used here has, for example, a data transfer function at Layer 2 and Layer 3 of the open systems interconnection (OSI) reference model. Note that, basic structures and functions of the IFSs 14a to 14x and the FSs 16a to 16h may be common to one another.

The plurality of terminal devices 12 are each connected to any one of the IFSs 14a to 14x in a distributed manner. Note that, the number of terminal devices 12 connected to each of the IFSs 14a to 14x may not be uniform. Further, there is no restriction on which type of terminal device 12 is to be connected to which of the IFSs 14a to 14x. In addition, the terminal device 12 may be a personal computer, a workstation, or the like other than the server.

In the network relay system 10, the IFSs 14a to 14x are each connected to the FSs 16a to 16h through physical lines. The physical line is, for example, an optical fiber cable or a twisted pair cable. Note that, in FIG. 1, reference numerals for the individual physical lines are omitted. Further, some of the IFSs 14a to 14x are omitted from the illustration, but are each connected to the FSs 16a to 16h through the physical lines as well. The physical lines are connected to ports (not shown) of the IFSs 14a to 14x and the FSs 16a to 16h.

In each of the IFSs 14a to 14x, a link aggregation group, that is, one of LAGs 18a, 18b, . . . , and 18x is set for the ports connected to the FSs 16a to 16h. Link aggregation is a function of handling a plurality of physical lines as logically one line. In each of the IFSs 14a to 14x, the plurality of ports for which one of the LAGs 18a, 18b, . . . , and 18x is set work as logically one port.

To transmit a network frame received from each of the terminal devices 12 to the FSs 16a to 16h, each of the IFSs 14a to 14x decides, in accordance with a predetermined algorithm, which port within the corresponding one of the LAGs 18a, 18b, . . . , and 18x the network frame is to be transmitted from. In accordance with the predetermined algorithm, when a network frame is received from the connected terminal device 12, an arithmetic operation (for example, the four fundamental operations) is performed by using MAC addresses, IP addresses, and the like indicated by destination information and transmission source information that are included in the network frame, and a port number to be used for transmission is decided based on a value thus obtained. At this time, an identification number (INDEX) may be set for each port within each of the LAGs 18a, 18b, . . . , and 18x in advance, and the value obtained by the above-mentioned arithmetic operation may be associated with the identification number of the port. In any case, each of the IFSs 14a to 14x uniquely decides the port to be used for the transmission of the network frame based on specific information within the network frame to thereby balance the load caused when the network frame received from the terminal device 12 is transmitted to the FSs 16a to 16h and secure a communication band that is necessary for the network relay system 10 as a whole.

Further, in the network relay system 10 according to this embodiment, in accordance with the above-mentioned algorithm, a communication path at a time of transmission (upstream) is matched with a communication path at a time of reception (downstream) when the transmission/reception of a network frame is performed between arbitrary two terminal devices 12.

For example, consideration is given to a case where two terminal devices 12 that are respectively connected to two different IFS 14a and the IFS 14b transmit/receive a network frame to/from each other. In this case, in accordance with the above-mentioned algorithm, the network frame transmitted from the terminal device 12 (transmission source) connected to the IFS 14a is, for example, transferred to the IFS 14b via a specific FS 16d and then transferred from the IFS 14b to the terminal device 12 that is a transmission destination (destination). At this time, the IFS 14b has the LAG 18b set for all ports opposed to the FSs 16a to 16h, and hence the network frame is not to be transmitted by return from the IFS 14b to within the LAG 18b.

On the other hand, in a case where the terminal device 12 connected to the IFS 14b is the transmission source, the network frame is transmitted from the IFS 14b to the FS 16d and further transmitted from the FS 16d to the terminal device 12 that is the transmission destination via the IFS 14a. Also here, in the same manner, the IFS 14a has the LAG 18a set for all the ports opposed to the FSs 16a to 16h, and hence the network frame is not to be transmitted by return to within the LAG 18a.

In this manner, in the case where the network frame is transmitted/received between the two terminal devices 12 connected to the two different IFS 14a and the IFS 14b, the same port is used in both directions by the IFS 14a and the IFS 14b that relay the network frame. Here, the combination of the two terminal devices 12 connected to the IFS 14a and the IFS 14b is taken as an example, and similarly at the time of transmission/reception between any other combination of the terminal devices 12, the same communication path and the same port are used in both directions at the time of transmission and at the time of reception.

Further, in a case where a virtual local area network (VLAN) is set for the respective terminal devices 12 connected to the network relay system 10, the IFSs 14a to 14x and the FSs 16a to 16h each perform the transmission/reception of the network frame by using a tagged VLAN in principle. At this time, all VLAN information pieces assigned to the respective terminal devices 12 are registered in the respective ports of the FSs 16a to 16h. Then, the IFSs 14a to 14x and the FSs 16a to 16h each transmit the network frame with the VLAN information piece tagged in accordance with the individual received network frame. With this arrangement, even when the VLAN is set for the respective terminal devices 12, the same communication path is used at the time of transmission and at the time of reception between the different terminal devices 12.

In this manner, a basic operation of the network relay system 10 according to this embodiment is to relay the transmission/reception of the network frame between the terminal devices 12 connected to different IFSs 14a to 14x by applying a predetermined algorithm. In order to realize such a basic operation, appropriate setting of the LAGs 18a to 18x in the respective IFSs 14a to 14x is a precondition.

Here, the "appropriate setting of the LAGs 18a to 18x" includes two types, that is, "physical setting" and "logical setting". First, the physical setting is realized by physically matching connection port numbers with the respective FSs 16a to 16h among all the IFSs 14a to 14x. For example, assuming that the IFSs 14a to 14x each have ports assigned the numbers 1 to 8, it is possible to physically perform the "appropriate setting of the LAGs 18a to 18x" by connecting the FS 16a to the port assigned the number 1, connecting the FS 16b to the port assigned the number 2, and similarly connecting the FSs 16c to 16h to the ports assigned the numbers 3 to 8, respectively, in the stated order among all the IFSs 14a to 14x. Note that, connection relationships between physical port numbers and the FSs 16a to 16h may be other than the above-mentioned connection relationships.

Meanwhile, in order to realize the logical setting, it is not necessary to physically match the connection port numbers with the FSs 16a to 16h among all the IFSs 14a to 14x, but it is necessary to match logical identification information on physical ports connected to the FSs 16a to 16h among all the IFSs 14a to 14x. Specifically, it is possible to logically perform the "appropriate setting of the LAGs 18a to 18x" by matching the logical identification information among all the IFSs 14a to 14x in such a manner that identification information (such as port index) on the port connected to the FS 16a is, for example, "1", identification information (such as port index) on the port connected to the FS 16b is, for example, "2", and similarly identification information on the ports connected to the FSs 16c to 16h is, for example, "3" to "8", respectively, in the stated order among all the IFSs 14a to 14x. Note that, correlations between the logical identification information on the ports and the FSs 16a to 16h may be other than the above-mentioned correlations.

In this manner, to appropriately set the LAGs 18a to 18x, all the IFSs 14a to 14x need to physically or logically have common connection relationships with the respective FSs 16a to 16h, but it is extremely complicated to manually set the LAGs 18a to 18x while artificially managing all the connection relationships.

Therefore, in this embodiment, a function (automatic setting function) of recognizing the connection relationships with the respective FSs 16a to 16h in the respective IFSs 14a to 14x and automatically setting the LAGs 18a to 18x based on results thereof is realized only by the respective IFSs 14a to 14x. That is, in this embodiment, the "appropriate setting of the LAGs 18a to 18x" is realized by a logical method.

Hereinafter, description is made of configurations of the IFSs 14a to 14x and the FSs 16a to 16h which are necessary for realizing the above-mentioned automatic setting function of the network relay system 10. Note that, as has already been described, the "IFSs 14a to 14x" and the "FSs 16a to 16h" may be referred to generically as the "IFSs 14" and the "FSs 16", respectively, in the following description.

(Fabric Switch)

Figure 2:
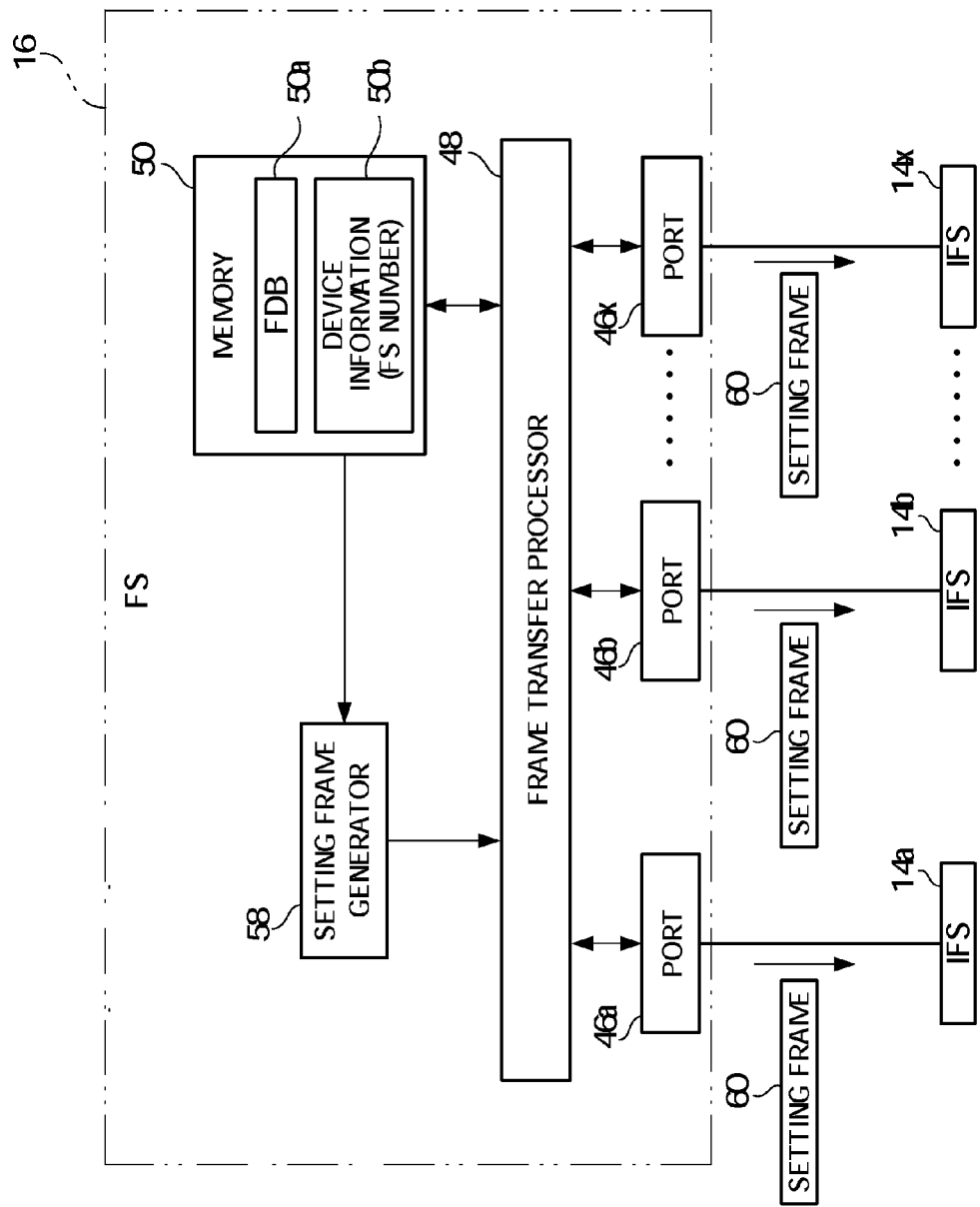
FIG. 2 is a block diagram schematically illustrating a functional configuration of an FS.

FIG. 2 is a block diagram schematically illustrating a functional configuration of the FS 16. That is, the individual FSs 16a to 16h have the same basic configuration and function.

The FS 16 includes a plurality of ports 46a, 46b, . . . , and 46x. It is assumed that the number of ports of the FS 16 covers the number of IFSs 14a to 14x placed within the network relay system 10 (the FS 16 includes at least the same number of ports as the number of IFSs 14). Note that, the "ports 46a, 46b, . . . , and 46x" may be referred to also as "ports 46" in the following description. Further, the number of ports 46 is not limited to the number illustrated in the drawing.

In addition to the ports 46, the FS 16 includes a frame transfer processor 48 and a memory 50.

Of those, the memory 50 is made up of, for example, a rewritable random-access memory (RAM). The memory 50 stores a forwarding database (FDB) 50a. Further, as identification information (first identification information) unique to the FSs 16, the memory 50 stores, for example, device information 50b assigned to the FSs 16a to 16h on an individual basis. The device information 50b is, for example, a device number (FS number) unique to each of the FSs 16a to 16h.

The ports 46 are respectively connected to the IFSs 14a to 14x. Upon reception of the network frame transmitted from each of the IFSs 14a to 14x, the port 46 transfers the received network frame to the frame transfer processor 48.

Further, each of the ports 46 transmits the network frame transferred from the frame transfer processor 48 to one of the IFSs 14a to 14x.

(Frame Transfer Processor)

The frame transfer processor 48 is implemented by, for example, an integrated circuit such as a field programmable gate array (FPGA) or an application-specific integrated circuit (ASIC).

The frame transfer processor 48 transfers the network frame to the port 46 of a transfer destination based on the destination information within the network frame. Further, the frame transfer processor 48 creates and updates the FDB 50a based on the transmission source information within the network frame.

The transmission source information within the network frame received on the port 46 and a number assigned to the port 46 that has received the network frame are registered in the FDB 50a in association with each other.

That is, when the network frame is transferred from the port 46, the frame transfer processor 48 relays the network frame to the port 46 of the transfer destination based on the information registered in the FDB 50a.

(Setting Frame Generator)

Further, the FS 16 includes a setting frame generator 58. The setting frame generator 58 is configured to cause the IFSs 14a to 14x to automatically set the LAGs 18a to 18x. The setting frame generator 58 generates a setting frame 60 (first setting frame) including the device information 50b assigned to each of the FSs 16a to 16h.

That is, the setting frame generator 58 generates the setting frame 60 that includes the device information 50b stored in the memory 50.

The setting frame 60 generated by the setting frame generator 58 is transmitted from the ports 46a to 46x to the connected IFSs 14a to 14x via the frame transfer processor 48. Therefore, the setting frame generator 58 constitutes a setting frame transmitter (first setting frame transmitter) within the FS 16.

The setting frame generator 58 is also implemented by, for example, an integrated circuit such as an FPGA or an ASIC.

(Interface Switch)

Figure 3:
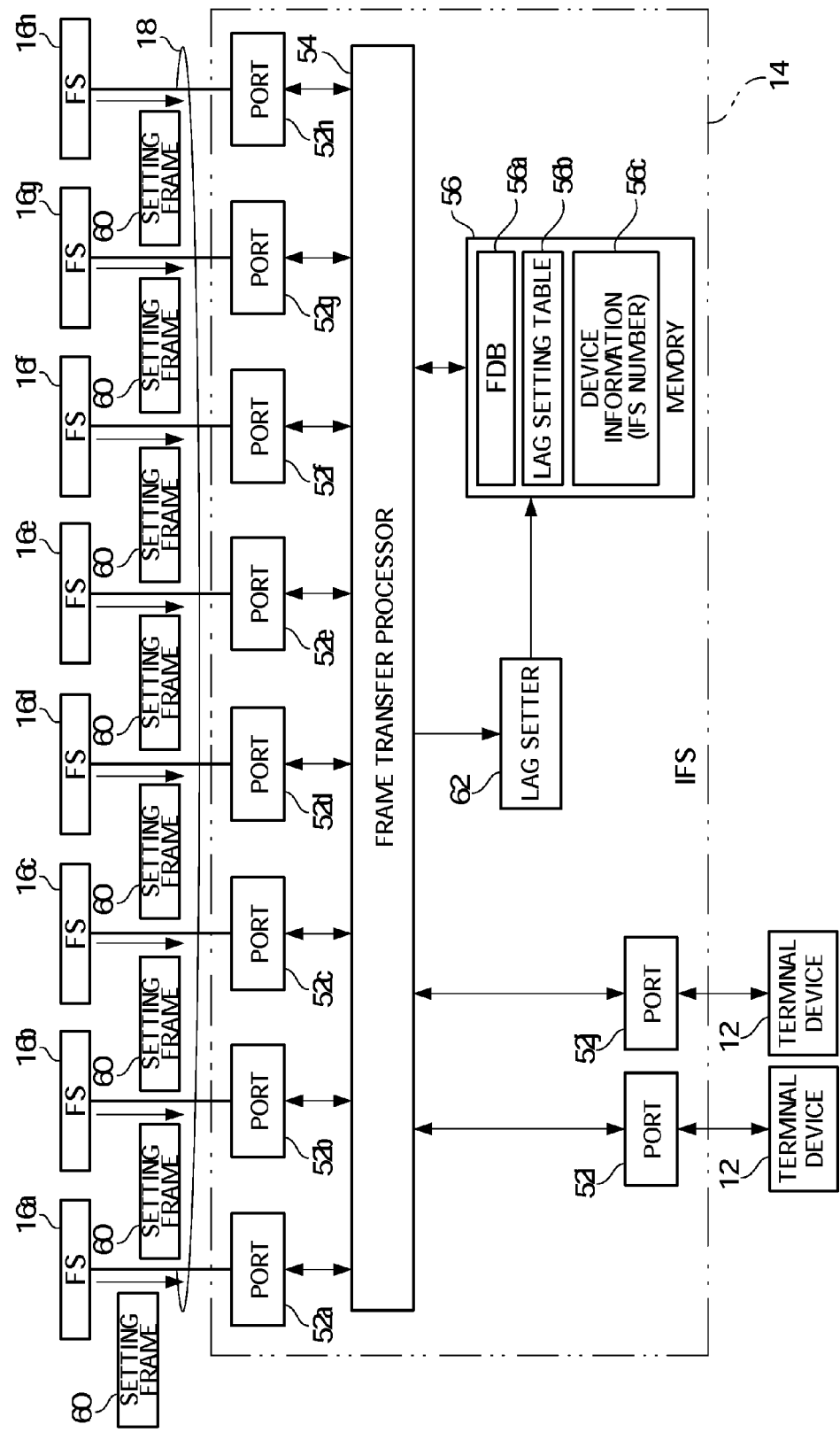
FIG. 3 is a block diagram schematically illustrating a functional configuration of an IFS.

FIG. 3 is a block diagram schematically illustrating a functional configuration of the IFS 14. That is, the individual IFSs 14a to 14x have the same basic configuration and function. Further, the IFSs 14 and the FSs 16 have the same basic configuration and function as the switching hub. On that condition, FIG. 3 illustrates characteristic components as the IFS 14.

The IFS 14 includes a plurality of ports 52a to 52j. Further, the IFS 14 includes a frame transfer processor 54 and a memory 56.

The memory 56 is made up of, for example, a RAM. The memory 56 stores an FDB 56a and an LAG setting table 56b. Further, the memory 56 stores, for example, device information 56c assigned to the IFSs 14a to 14x on an individual basis as identification information (second identification information) unique to the IFS 14. Here, the device information 56c is, for example, a device number (IFS number) unique to each of the IFSs 14a to 14x.

In FIG. 3, the ports 52a to 52h illustrated above the frame transfer processor 54 are connected to the FSs 16a to 16h, respectively. Further, the ports 52i and 52j illustrated below the frame transfer processor 56 are respectively connected to the different terminal devices 12. Note that, in the following description, the "ports 52a to 52j" may be referred to also as "ports 52".

FIG. 3 illustrates ten ports 52a to 52j, but the number of ports is not limited to the number illustrated in FIG. 3. Further, it is assumed that the number of ports covers the number of FSs 16a to 16h placed within the network relay system 10 (the IFS 14 includes at least the same number of ports as the number of FSs 16).

In the IFS 14 (assumed as IFS 14a) illustrated in FIG. 3, the FSs 16a to 16h are connected to ports 52a to 52h, respectively, in an order of arrangement. That is, the FS 16a is connected to the port 52a, the FS 16b is connected to the port 52b, the FS 16c is connected to the port 52c, and the like. The other IFSs 14b to 14x are similarly connected to the FSs 16a to 16h, but those IFSs 14b to 14x are not necessarily connected to the FSs 16a to 16h in the same order as the ports 52a to 52h of the IFS 14a.

For example, the FS 16a connected to the port 52a in the IFS 14a may be connected to the port 52b instead of the port 52a in the other IFS 14b. In addition, in the other IFS 14c, the FS 16a may be connected to the port 52c. This is because the "appropriate setting of the LAGs 18a to 18x" is realized by a logical method in this embodiment.

The ports 52a to 52h transfer the network frame received from the FSs 16a to 16h to the frame transfer processor 54. Further, the ports 52a to 52h transmit the network frame transferred from the frame transfer processor 54 to the connected FSs 16a to 16h.

The other ports 52i and 52j transfer the network frame received from the respective terminal devices 12 to the frame transfer processor 54. Further, the ports 52i and 52j transmit the network frame transferred from the frame transfer processor 54 to the connected terminal devices 12.

(Frame Transfer Processor)

The frame transfer processor 54 is implemented by, for example, an integrated circuit such as an FPGA or an ASIC in the same manner as the frame transfer processor 48 of the FS 16 illustrated in FIG. 2.

The frame transfer processor 54 transfers the network frame to the port 52 of the transfer destination based on the destination information within the network frame. Further, the frame transfer processor 54 creates and updates the FDB 54a based on the transmission source information within the network frame.

The transmission source information within the network frame received on the port 52 and a number assigned to the port 52 that has received the network frame are registered in the FDB 56a in association with each other.

The frame transfer processor 54 of the IFS 14 references the FDB 56a to relay the network frame to one of the ports 52i and 52j that is connected to the terminal device 12 that is the transmission destination. Further, the frame transfer processor 54 references the LAG setting table 56b together with the FDB 56a to relay the network frame to one of the ports 52a to 52h that is connected to the FSs 16a to 16h that is the transmission destination.

(Transfer Processing within the Same IFS 14)

For example, it is assumed that the terminal device 12 connected to the port 52i transmits data to the terminal device 12 connected to the other port 52j. In this case, the terminal device 12 that is the transmission source transmits the network frame including the data to the IFS 14. The transmitted network frame is received on the port 52i and transferred to the frame transfer processor 54.

The frame transfer processor 54 references the FDB 56a based on the destination information and the transmission source information that are included in the network frame. At this time, in a case where the destination information indicating the other terminal device 12 is registered in the FDB 56a in association with the port 52j, the frame transfer processor 56 relays the network frame to the port 52j. Then, the port 52j transmits the network frame to the connected terminal device 12.

(Transfer Processing between Different IFSs 14)

Further, in a case where the terminal device 12 connected to the port 52i transmits data to the terminal device 12 connected to another one of the IFSs 14a to 14x, the network frame transmitted from the terminal device 12 of the transmission source is received on the port 52i and transferred to the frame transfer processor 54.

In a case where the destination information included in the network frame is registered in association with one of the ports 52a to 52h that form the LAG 18, the frame transfer processor 54 references the LAG setting table 56b. Note that here, the "LAGs 18a, 18b, . . . , and 18x" illustrated in FIG. 1 are referred to generically as "LAGs 18".

In accordance with a predetermined algorithm, the frame transfer processor 54 selects the port 52 that is to transmit the network frame from among the ports 52 registered in the LAG setting table 56b. The frame transfer processor 54 relays the network frame to the selected port 52, and the selected port 52 transmits the network frame to the connected one of the FSs 16a to 16h.

(LAG Setter)

The IFS 14 includes an LAG setter 62 as a component for automatically setting the LAG 18. The LAG setter 62 creates and updates the LAG setting table 56b based on the setting frame 60 received from each of the FSs 16a to 16h.

That is, the LAG setter 62 recognizes each of the ports 52a to 52h that has received the setting frame 60 and the FS number indicated by the received individual setting frame 60 in association with each other. Then, the LAG setter 62 registers a combination of each of the ports 52 and the FS number that have been recognized in association with each other in the LAG setting table 56b. For example, in a case where the setting frame 60 received on the port 52a includes the device information 50b (FS number) on the FS 16a, the LAG setter 62 registers the port 52a in association with the FS number of the FS 16a in the LAG setting table 56b. In the same manner, in cases where the setting frames 60 received on the respective other ports 52b to 52h include the FS numbers of the FSs 16b to 16h, the LAG setter 62 registers the FS numbers of the FSs 16b to 16h in association with the ports 52b to 52h, respectively, in the LAG setting table 56b. With this arrangement, the combinations of the respective ports 52 and the respective FS numbers of the FSs 16 are registered in the LAG setting table 56b.

Further, the LAG setter 62 sorts (rearranges) the combinations of the respective ports 52 and the respective FS numbers based on the FS numbers. Then, the sorted combinations of the respective ports 52 and the FS numbers are registered in the LAG setting table 56b as a link aggregation group to thereby set the LAG 18.

By performing the above-mentioned setting by the LAG setters 62 of the respective IFSs 14a to 14x, it is possible to set the LAGs 18a to 18x for the respective ports 52a to 52h recognized in association with the respective FS numbers of the FSs 16a to 16h in accordance with the common order of arrangement based on the FS numbers. In this manner, the LAG setter 62 constitutes a first LAG setter within each of the IFSs 14a to 14x.

The LAG setter 62 is also implemented by, for example, an integrated circuit such as an FPGA or an ASIC.

Hereinafter, an operation example of performing automatic setting of the LAGs 18 is described by taking a plurality of patterns.

(Operation Example 1 for Automatic Setting)

Figure 4A:
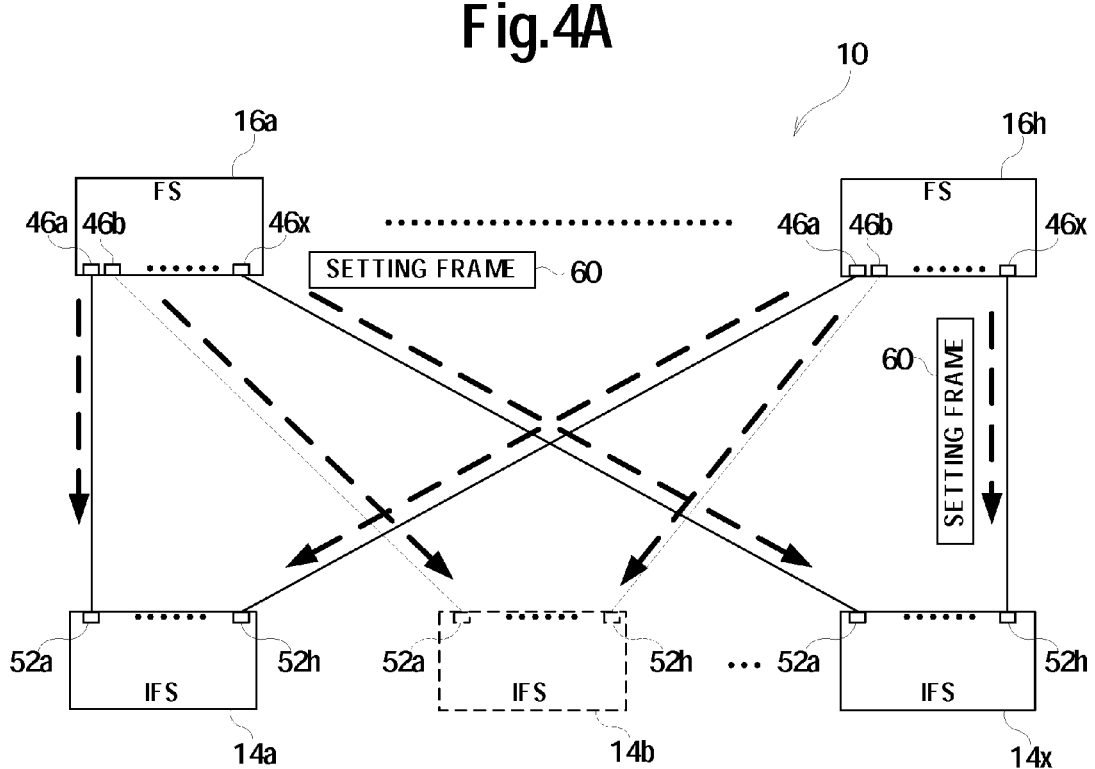
FIGS. 4A and 4B are diagrams illustrating Operation Example 1 performed when LAGs are automatically set in the respective IFSs.
Figure 4B:
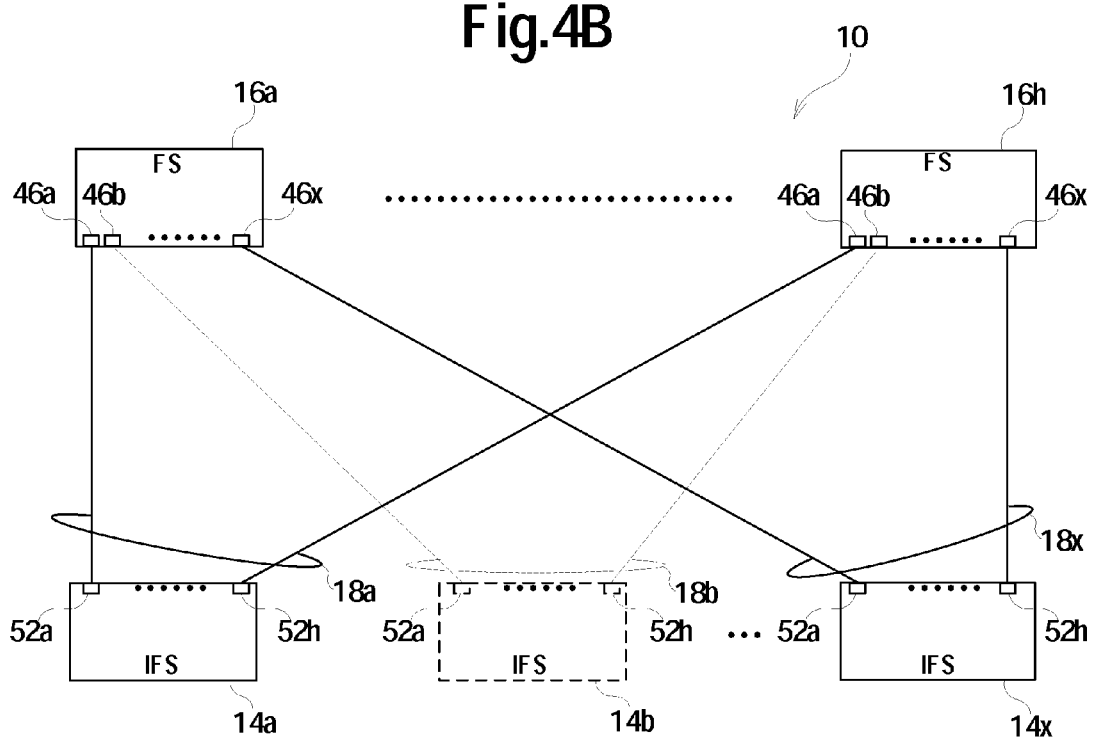

FIGS. 4A and 4B are diagrams illustrating Operation Example 1 performed when the LAGs 18 are automatically set in the respective IFSs 14. The automatic setting of the LAGs 18 is performed, for example, when a physical configuration of the network relay system 10 is built up and started up, when the configuration of the network relay system 10 is changed due to newly added or deleted FS 16 or IFS 14, when a failure occurs within the network relay system 10, and when the network relay system 10 recovers from the failure.

Note that, in FIG. 4 and the subsequent figures, for the sake of brevity, some of the IFSs 14a to 14x and the FSs 16a to 16h are omitted from the illustration as appropriate. Meanwhile, the illustration of some of the ports 46a to 46x and the ports 52a to 52x that relate to the description is added in order to facilitate the understanding of the operation example.

As illustrated in FIG. 4A, it is assumed that the physical configuration of the network relay system 10 is built up and the FSs 16a to 16h and the IFSs 14a to 14x are normally started up. At this time, in the respective IFSs 14a to 14x, all the FSs 16a to 16h are not necessarily connected to the ports assigned the same number and may be connected to the ports assigned arbitrary numbers.

The FSs 16a to 16h cause the respective setting frame generators 58 to generate the setting frames 60, and transmit the setting frames 60 to the IFSs 14a to 14x connected to the ports 46a to 46x, respectively. At this time, the setting frame 60 includes the FS numbers of the respective FSs 16a to 16h as identification information. In FIG. 4A, transmission directions of the setting frames 60 from the respective FSs 16a to 16h are indicated by the dotted arrows, and only part of the setting frames 60 are illustrated.

(At Time of Reception of Setting Frame)

The LAG setter 62 of each of the IFSs 14a to 14x recognizes the FS number of a transmission source included in the received setting frame 60 and each of the ports 52a to 52h that has received the setting frame 60 in association with each other, and registers a combination of the FS number of the transmission source and each of the ports 52a to 52h in the LAG setting table 56b.

(LAG Automatic Setting)

Then, as illustrated in FIG. 4B, the LAG setter 62 of each of the IFSs 14a to 14x sorts the ports 52a to 52h based on the FS numbers of the transmission sources, and sets each of the LAGs 18a to 18x for the ports 52a to 52h registered in the LAG setting table 56b.

At this time, the setting of each of the LAGs 18a to 18x is performed based on the FS numbers associated with the respective ports instead of the physical port numbers. That is, the physical port numbers of each of the IFSs 14a to 14x are sorted based on the FS numbers, and then grouped into each of the LAGs 18a to 18x in accordance with the sorted order (sequence). With this arrangement, in the respective IFSs 14a to 14x, the LAGs 18a to 18x are set for the respective ports 52a to 52h recognized in association with the FS numbers in accordance with the common order of arrangement based on the FS numbers (sorted order based on the FS numbers).

(Distribution of LAGs)

After the automatic setting of the LAGs 18a to 18x has been performed, upon reception of the network frame transmitted from the terminal devices 12 (not shown), each of the IFSs 14a to 14x uniquely decides the port to be used to transfer the network frame in accordance with a predetermined algorithm from among the ports 52a to 52h belonging to each of the LAGs 18a to 18x. At this time, in the respective IFSs 14a to 14x, paths (communication path at a time of transmission and communication path at a time of reception) of the LAGs 18a to 18x are logically matched with each other (that is, matched state of distribution of LAGs).

(Method of Realizing Operation Example 1)

Figure 5:
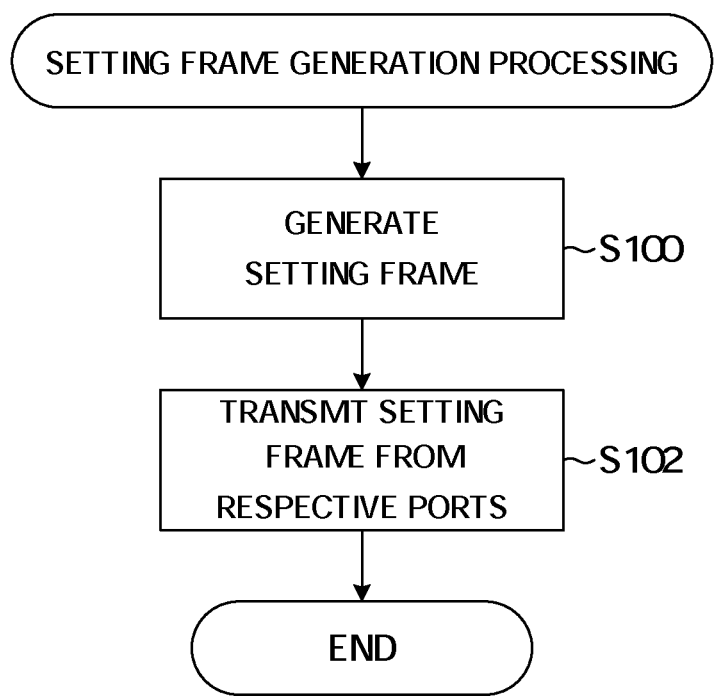
FIG. 5 is a flowchart illustrating a method of realizing automatic setting illustrated in FIGS. 4A and 4B.
Figure 6:
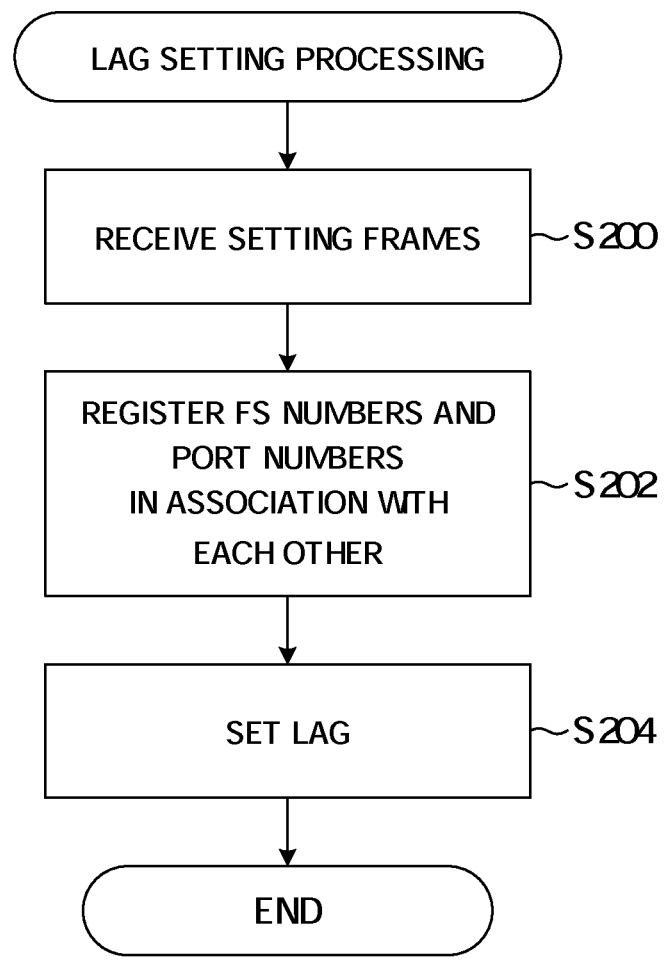
FIG. 6 is a flowchart illustrating a method of realizing the automatic setting illustrated in FIGS. 4A and 4B.

FIGS. 5 and 6 are flowcharts each illustrating a method of realizing the automatic setting illustrated in FIGS. 4A and 4B. Of those, FIG. 5 illustrates a setting frame generation processing performed by the FS 16. FIG. 6 illustrates an LAG setting processing performed by the IFS 14.

(Setting Frame Generation Processing)

The setting frame generation processing illustrated in FIG. 5 is executed, for example, when the power of the FSs 16a to 16h is turned on, when the IFSs 14a to 14x are connected to the ports 46a to 46x, respectively, every predetermined time interval on a regular basis, or at an arbitrary timing based on a worker's operation.

Each of the FSs 16a to 16h causes the setting frame generator 58 to generate the setting frame 60 (Step S100). Then, each of the FSs 16a to 16h transmits the setting frame 60 from the respective ports 46a to 46x (Step S102), and finishes the processing (END).

(LAG Setting Processing)

In the LAG setting processing illustrated in FIG. 6, each of the IFSs 14a to 14x receives the setting frames 60 transmitted from the FSs 16a to 16h (Step S200). Note that here, the setting frames 60 are received as one step, but the following procedure may be executed with a fact that each of the IFSs 14a to 14x has received the setting frames 60 as a trigger.

Each of the IFSs 14a to 14x recognizes the FS numbers indicated by the received setting frames 60 and port numbers of the ports used at the time of reception in association with each other, and registers the combinations of the FS numbers of the transmission sources and the port numbers used at the time of reception in the LAG setting table 56b (Step S202).

Then, each of the IFSs 14a to 14x causes the LAG setter 62 to perform the sorting based on the FS numbers to set each of the LAGs 18a to 18x for the ports 52a to 52h (Step S204), and the processing is finished here (END).

(LAG Setting Table)

FIG. 7 is a diagram illustrating a structure of the LAG setting table 56b set according to Operation Example 1. As indicated in the "transmission source FS number" field of FIG. 7, the LAG setting table 56b is sorted based on the FS numbers. As to the FS numbers, for example, "1" is a device number (identification information unique to each individual) indicating an individual of the "FS 16a", and "8" is a device number indicating the "FS 16h". Note that here, the FS numbers are serial numbers "1" to "8", but may be random numbers that are unique to the respective IFSs 14a to 14x and able to be automatically sorted in accordance with some criterion (for example, numerical comparison).

Further, the port numbers (physical port numbers) that have received the setting frames 60 are illustrated in the "LAG assigned port" field of FIG. 7. Here, for the sake of brevity, reference numerals are illustrated as the port numbers. The respective port numbers are registered in association with the transmission source FS numbers. For example, the "port 52c" is registered in association with the FS number "1", while the other "port 52e" is registered in association with the FS number "2". Therefore, in this example, it is apparent that the "port 52c" is connected to the FS 16a (FS number "1") and the "port 52e" is connected to the FS 16b (FS number "2") (the same applies to the other relationships).

Further, for example, "100" is illustrated as a group number in the "LAG ID" field of FIG. 7. The ports (ports 52a to 52h) illustrated in the "LAG assigned port" field belong to the LAG 18 having a common group number.

(Summary of Operation Example 1)

In this manner, by transmitting the setting frames 60 from the respective FSs 16a to 16h, the respective IFSs 14a to 14x can automatically set the LAGs 18a to 18x. An administrator of a network no longer needs to manually set the LAGs 18a to 18x for the respective IFSs 14a to 14x, which can reduce a workload imposed thereon. Further, also when the configuration of the network relay system 10 is changed, when a failure occurs within the network relay system 10, and when the network relay system 10 recovers from the failure, by transmitting the setting frames 60 from the respective FSs 16a to 16h to the respective IFSs 14a to 14x, the respective IFSs 14a to 14x can automatically reset the LAGs 18a to 18x based on the received setting frame 60.

Further, the respective IFSs 14a to 14x set the LAGs 18a to 18x in accordance with the common order of arrangement based on the FS numbers, and hence it is no longer necessary to physically match the connection port numbers with the respective FSs 16a to 16h among all the IFSs 14a to 14x. Therefore, the administrator of the network no longer needs to care about a wiring error between the ports when connecting between the IFSs 14a to 14x and the FSs 16a to 16h by cables, which can reduce the load on wiring work.

Further, the respective IFSs 14a to 14x decide the port to be used to transmit the network frame based on the value calculated in accordance with the predetermined algorithm when each transmitting the received network frame from the port belonging to one of the LAGs 18a to 18x. In addition, the respective IFSs 14a to 14x set the LAGs 18a to 18x for the ports in accordance with the common order of arrangement based on the FS numbers. Therefore, without having to match the physical port numbers of the ports connected to the respective FSs 16a to 16h in the respective IFSs 14a to 14x, two-way communications between the terminal devices 12 connected to different IFSs 14a to 14x can be caused to pass through the same communication path in upstream and downstream directions. Accordingly, it is possible to prevent such an event that a time required to transfer the network frame differs between the upstream and downstream directions and achieve efficient use of a communication band by matching the state of distribution of paths.

(Operation Example 2)

Operation Example 2 of the LAG automatic setting is provided on the precondition that the FS 16 sets an LAG for ports connected to the same IFS 14. In order to realize Operation Example 2, in the network relay system 10 according to this embodiment, the FS 16 and the IFS 14 are respectively set to have the following configurations.

(Fabric Switch)

Figure 8:
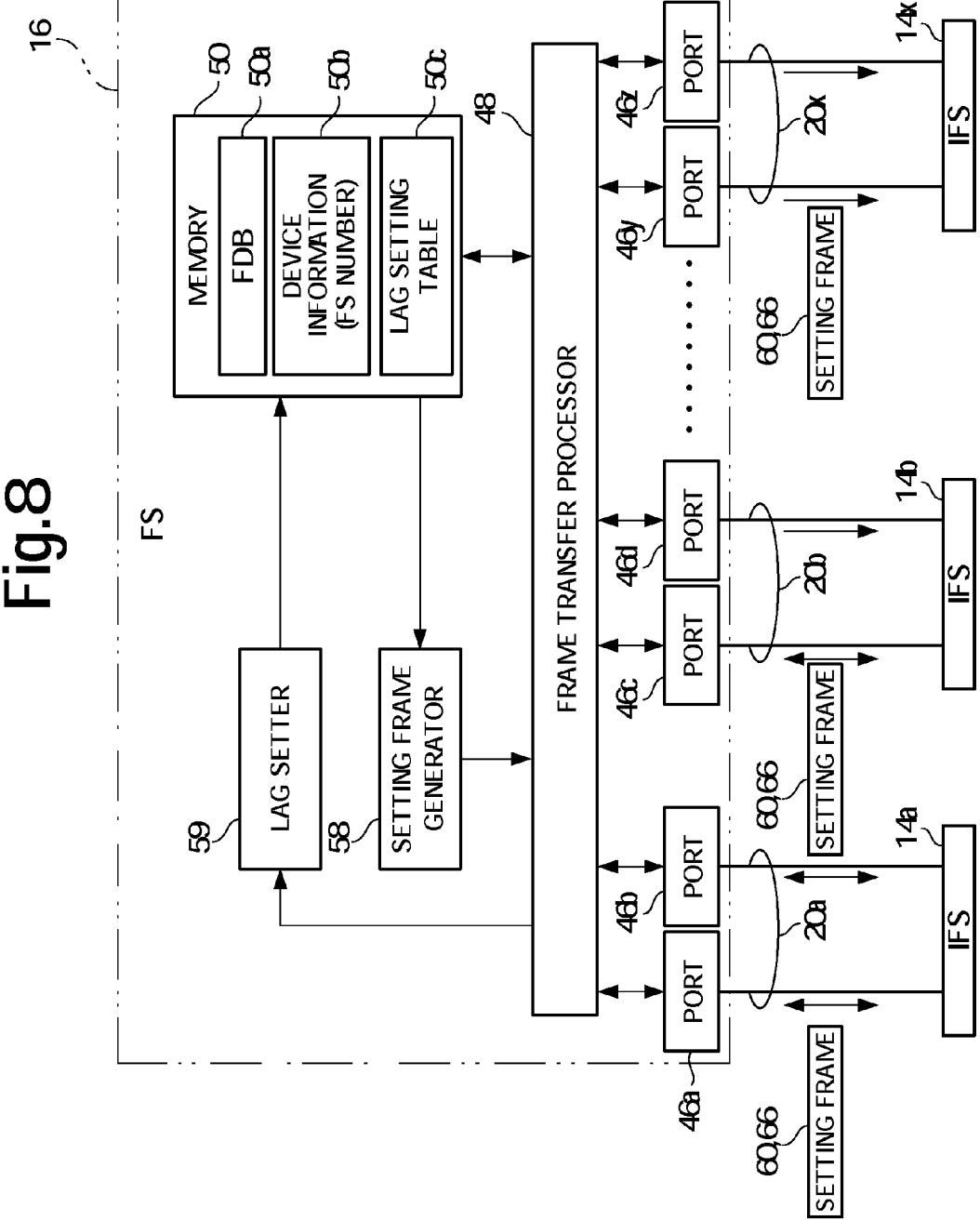
FIG. 8 is a block diagram schematically illustrating a functional configuration of an FS for realizing Operation Example 2.

FIG. 8 is a block diagram schematically illustrating a functional configuration of the FS 16 for realizing Operation Example 2. In order to realize Operation Example 2, some components are added to the FS 16 illustrated according to Operation Example 1.

As illustrated in FIG. 8, in Operation Example 2, the FS 16 includes an LAG setter 59. Therefore, in Operation Example 2, the FS 16 also performs the automatic setting by making use of the function of the LAG setter 59. The LAG setter 59 constitutes an LAG setter (second LAG setter) within the FS 16.

Further, an LAG setting table 50c is stored in the memory 50. Registered in the LAG setting table 50c is information on LAGs set by the LAG setter 59 (contents of which are described later).

(Number of Ports)

In order to set the LAGs, the number of ports of the FS 16 needs to be larger than that of Operation Example 1. That is, the number of ports that covers the number of IFSs 14a to 14x is used in Operation Example 1, but in Operation Example 2, for example, the number of ports twice as large as the number of IFSs 14a to 14x is used. Hereinafter, for the sake of brevity, it is assumed that the necessary number of ports 46a to 46z are provided to each of the FSs 16. Note that, the "ports 46a to 46z" are referred to also as "ports 46" in the following description.

(Interface Switch)

Figure 9:
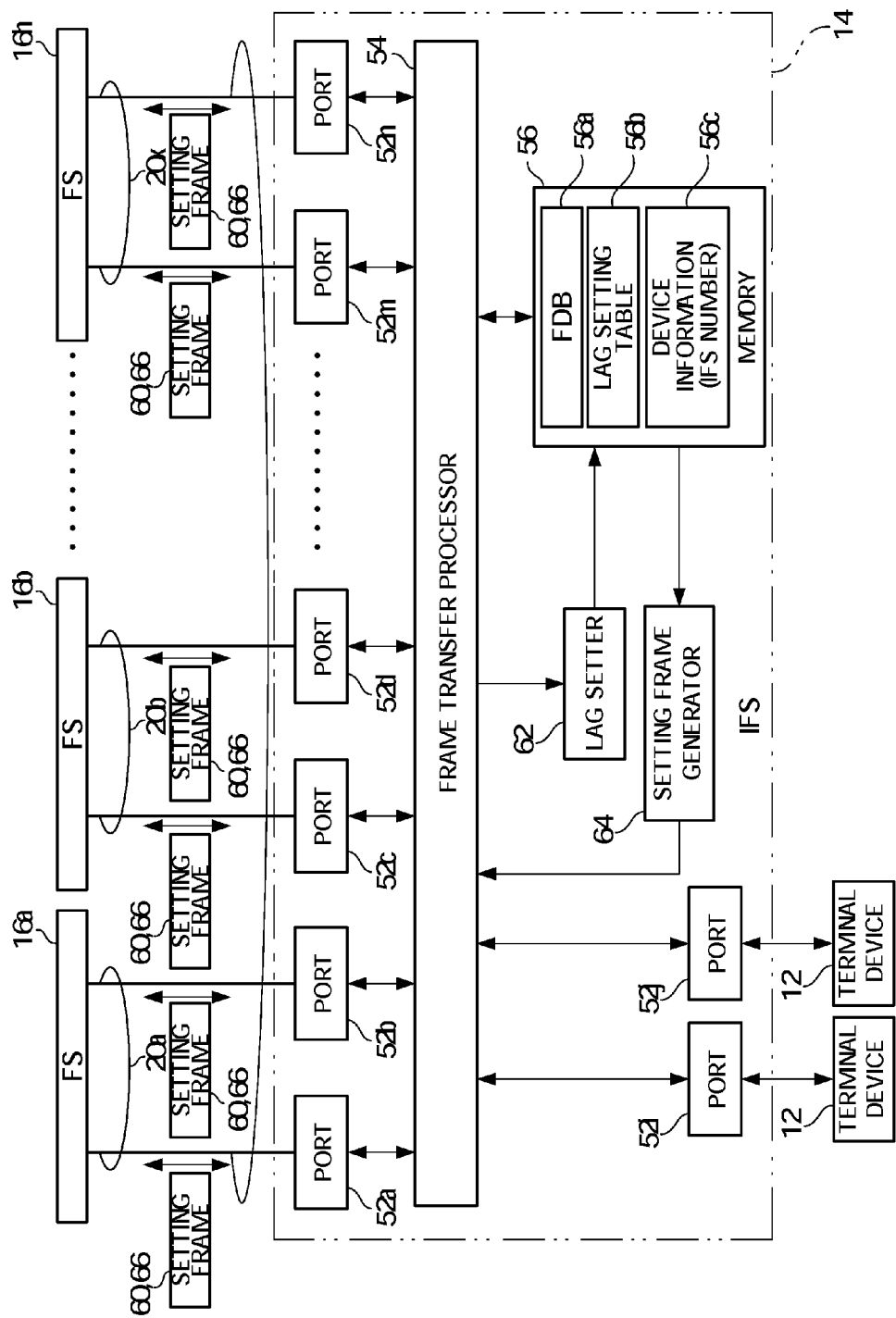
FIG. 9 is a block diagram schematically illustrating a functional configuration of an IFS for realizing Operation Example 2.

FIG. 9 is a block diagram schematically illustrating a functional configuration of the IFS 14 for realizing Operation Example 2. Also with regard to the IFS 14, in order to realize Operation Example 2, some components are added to the IFS 14 illustrated according to Operation Example 1.

As illustrated in FIG. 9, in Operation Example 2, the IFS 14 includes a setting frame generator 64. In Operation Example 2, it is assumed that the IFS 14 also performs the automatic setting by making use of the function of the setting frame generator 64. The setting frame generator 64 constitutes a setting frame transmitter (second setting frame transmitter) within the IFS 14.

The setting frame generator 64 is also implemented by, for example, an integrated circuit such as an FPGA or an ASIC.

(Number of Ports)

Further, the number of ports of the IFS 14 also needs to be larger than that of Operation Example 1. That is, the number of ports that can cover the number of FSs 16a to 16h is used in Operation Example 1, but in Operation Example 2, for example, the number of ports twice as large as the number of FSs 16a to 16h is used. Hereinafter, for the sake of brevity, it is assumed that the necessary number of ports 52a to 52n are provided to each of IFSs 14. Note that, the "ports 52a to 52n" are referred to also as "ports 52" in the following description.

The other components of both the FSs 16 and the IFSs 14 are the same as those of Operation Example 1. Therefore, here, the same components described in Operation Example 1 are denoted by the same reference symbols, and duplicate descriptions are omitted.

(Connection Relationship)

As illustrated in FIGS. 8 and 9, in Operation Example 2, the respective FSs 16 and the respective IFSs 14 are connected to each other through a plurality of (here, two) physical lines (reference symbols of the respective lines are omitted). Therefore, each of the FSs 16 is connected to one IFS 14 by using two ports 46, and each of the IFSs 14 also assigns two ports 52 to one FS 16.

At this time, each of the FSs 16 sets each of LAGs 20a, 20b, ..., and 20x for two ports 46 (for example, ports 46a and 46b) per individual IFS 14. Note that, the "LAGs 20a, 20b, ..., and 20x" are referred to also as "LAGs 20" in the following description.

Meanwhile, each of the IFSs 14 sets one of the LAGs 18a to 18x for all the ports 52a to 52n connected to the FSs 16a to 16h.

Figure 10A:
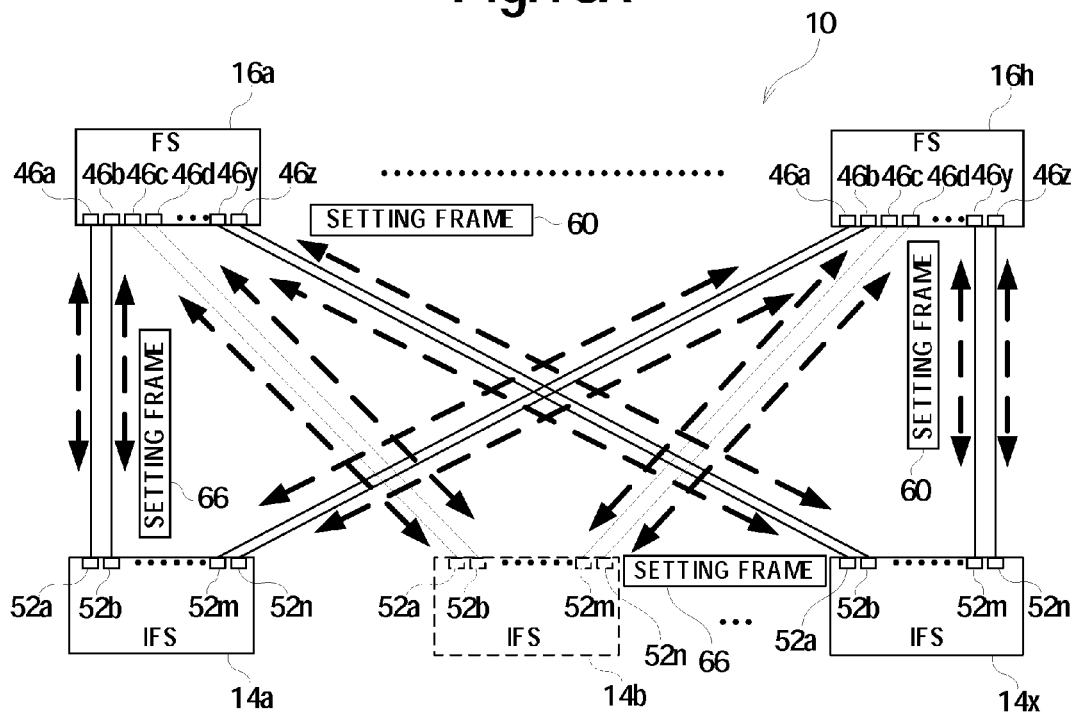
FIGS. 10A and 10B are diagrams schematically illustrating, as Operation Example 2, a mode in which LAGs are automatically set in the respective IFSs and LAGs are automatically set also in the respective FSs.
Figure 10B:
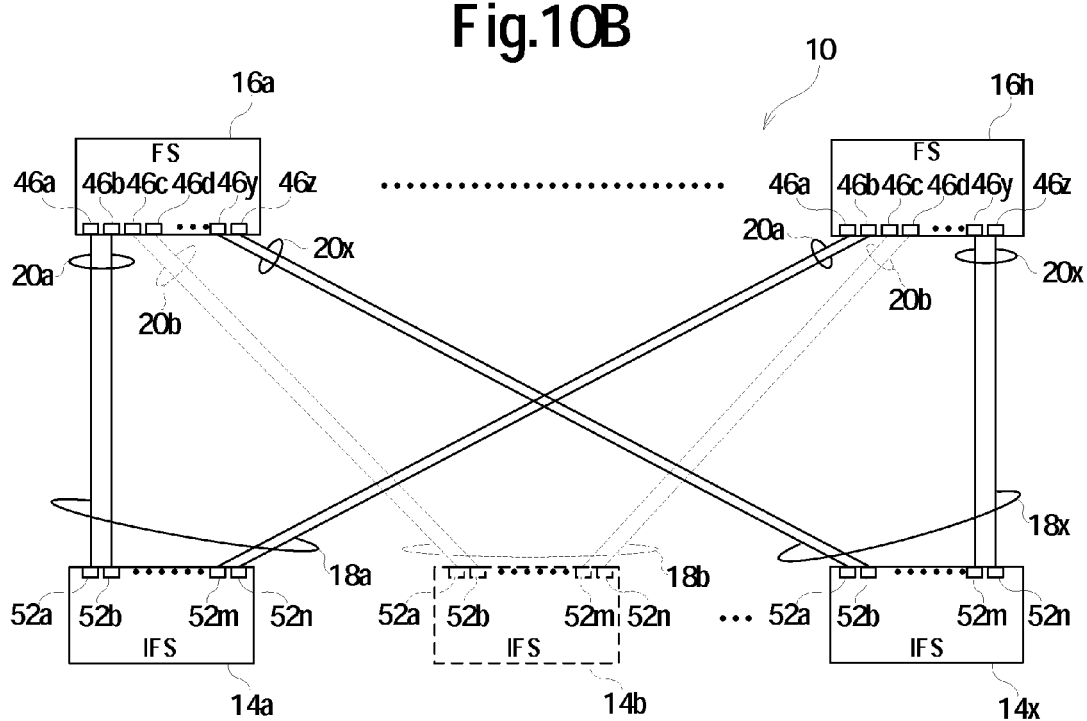

FIGS. 10A and 10B are diagrams schematically illustrating, as Operation Example 2, a mode in which the LAGs 18 are automatically set in the respective IFSs 14 and the LAGs 20 are also automatically set in the respective FSs 16.

As illustrated in FIG. 10A, in Operation Example 2, the setting frames 60 and 66 are transmitted from all the ports 46a to 46z and all the ports 52a to 52n of the FSs 16a to 16h and the IFSs 14a to 14x, respectively.

Specifically, in the same manner as in Operation Example 1, the FSs 16a to 16h each cause the setting frame generator 58 thereof to generate the setting frame 60, and transmit the setting frame 60 to the IFSs 14a to 14x connected to the ports 46a to 46z. At this time, the FS number of each of the FSs 16a to 16h is included in the setting frame 60 as identification information.

Meanwhile, the IFSs 14a to 14x each cause the setting frame generator 64 thereof to generate a setting frame 66 (second setting frame) as well, and transmits the setting frame 66 to the FSs 16a to 16h connected to the ports 52a to 52n. At this time, the IFS number is included in the setting frame 66 as individual-basis identification information on each of the IFSs 14a to 14x.

As illustrated in FIG. 10B, upon reception of the setting frames 66 transmitted from the IFSs 14a to 14x, each of the FSs 16a to 16h recognizes the included IFS numbers in association with the ports 46 used for the reception, and registers the combinations of the IFS numbers and the ports 46 in the LAG setting table 50c. Then, each of the FSs 16a to 16h causes the LAG setter 59 thereof to set the LAG 20 for each of pairs of the ports 46a to 46z that has the same IFS number. For example, in the FS 16a, the two ports 46a and 46b connected to the IFS 14a are set as an LAG 20a based on the IFS number (for example, "1"), and the two ports 46c and 46d connected to the IFS 14b are set as an LAG 20b based on the IFS number (for example, "2"). Further, the two ports 46y and 46z connected to the IFS 14x are set as an LAG 20x based on the IFS number (for example, "24").

In the same manner as in Operation Example 1, the LAG setter 62 of each of the IFSs 14a to 14x recognizes the FS numbers of the transmission sources indicated by the received setting frames 60 and the ports 52a to 52n that have received the setting frame 60 in association with each other, and registers the combinations of the FS numbers of the transmission sources and the ports 52a to 52n in the LAG setting table 56b.

Then, as illustrated in FIG. 10B, the LAG setter 62 of each of the IFSs 14a to 14x sorts the ports 52a to 52n based on the FS numbers of the transmission sources, and sets each of the LAGs 18a to 18x for the ports 52a to 52n registered in the LAG setting table 56b. Accordingly, in the respective IFSs 14a to 14x, the paths (communication path at the time of transmission and communication path at the time of reception) of the LAGs 18a to 18x are logically matched with each other (that is, matched state of distribution of LAGs).

In Operation Example 1, in each of the IFSs 14a to 14x, each of the FSs 16a to 16h is connected to one port 58. Therefore, each of the FSs 16a to 16h does not need to set an LAG for the ports 46 connected to the IFSs 14a to 14x. In contrast thereto, in Operation Example 2, in each of the FSs 16a to 16h, each of the IFSs 14a to 14x is connected two ports 46. By setting the LAG 20 for each pair of ports 46 connected to each of the IFSs 14a to 14x, each of the FSs 16a to 16h can set the two ports 46 (and two physical lines connected thereto) as one logical line.

In this manner, according to Operation Example 2, in addition to Operation Example 1, it is possible to automatically set the LAGs 20a to 20x in the FSs 16a to 16h based on the setting frames 66 transmitted from the IFSs 14a to 14x. Therefore, even in the case of setting the LAGs 20 between the FSs 16 and the IFSs 14, the worker or the administrator no longer needs to manually set the LAGs 20. This can reduce the workload, and the network relay system 10 can be quickly built up.

Further, according to Operation Example 2, even if a communication failure occurs in the FS 16 (for example, failure occurs in any one of the ports 46), the LAGs 20 are set between the respective FSs 16 and the respective IFSs 14, and hence it is possible to relay the network frame even after the failure occurrence. In this case, the LAGs 20 temporarily degenerate, but it is possible to prevent a frame from being discarded until the recovery to thereby provide the network relay system 10 with higher versatility than Operation Example 1.

(Method of realizing Operation Example 2)

Although not particularly illustrated in the figure, for example, at the time of power-on or at the time of restart after the recovery from the failure, the setting frame generator 64 of each of the IFSs 14a to 14x generates the setting frame 66 including the individual-basis IFS number, and transmits the setting frame 66 from the ports 52a to 52n connected to the FSs 16a to 16h.

Figure 11:
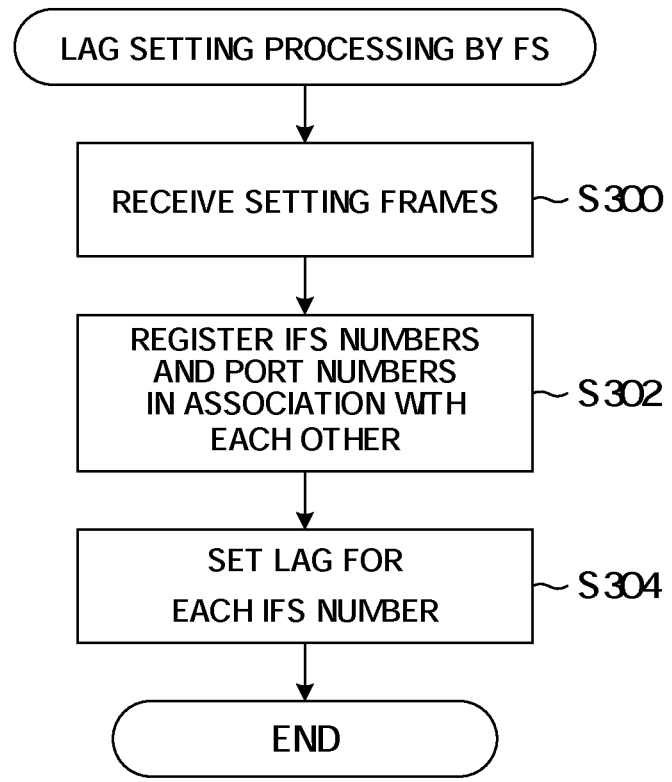
FIG. 11 is a flowchart illustrating a method of realizing automatic setting of LAGs performed in the respective FSs.

FIG. 11 is a flowchart illustrating a method of realizing the automatic setting of the LAGs 20 performed in the respective FSs 16, which is one of the types of the automatic setting described according to Operation Example 2.

Here, each of the FSs 16a to 16h receives the setting frames 66 transmitted from the IFSs 14a to 14x (Step S300). Note that, in this example, the setting frames 66 are received as one step, but the following procedure may be executed with a fact that each of the FSs 16a to 16h has received the setting frames 66 as a trigger.

Each of the FSs 16a to 16h recognizes the IFS numbers included in the received setting frames 66 and the port numbers of the ports used for the reception in association with each other, and registers the combinations of the IFS numbers of the transmission sources and the port numbers in the LAG setting table 50c (Step S302).

Then, the LAG setter 59 of each of the FSs 16a to 16h sets the LAG 20 for each of pairs of the ports 46 associated with the same IFS number (Step S304). Note that, the processing is finished here (END).

(LAG Setting Table on FS Side)

FIG. 12 is a diagram illustrating a structure of the LAG setting table 50c set in the FSs 16 according to Operation Example 2. As illustrated in FIG. 12, it is understood from the LAG setting table 50c of the FS 16 that the ports 46 associated with the same IFS number belong to the same LAG.

For example, the "port 46c" and the "port 46e" are associated with the transmission source IFS number "1" as indicated in the "LAG assigned port" field, and belong to the LAG having the same ID "101" as indicated in the "LAG ID" field. In the same manner, the "port 46b" and the "port 46d" are associated with the transmission source IFS number "2", and belong to the LAG having the same ID "102".

(Setting Table on IFS Side)

FIG. 13 is a diagram illustrating a structure of the LAG setting table 56b set in the IFS 14 according to Operation Example 2. As indicated in the "transmission source FS number" field of FIG. 13, Operation Example 2 is different from Operation Example 1 in that the duplicate FS numbers (for example, "1" and "1" and "2" and "2") are registered in the LAG setting table 56b. However, in the same manner as in Operation Example 1, the FS numbers "1" to "8" indicated by the received setting frame 60 and the ports (ports 52a to 52h) used at the time of reception are registered in the "LAG assigned port" field in association with each other.

Then, the LAG setter 62 serializes the sorted duplicate FS numbers when performing the sorting based on the FS numbers of the transmission sources. Therefore, the "transmission source FS number" field illustrates "1", "1", "2", "2", . . . , "8", and "8" in the sorting order.

Further, for example, "100" is illustrated in the "LAG ID" field as the group number. Therefore, in the same manner as in Operation Example 1, the ports (ports 52a to 52h) illustrated in the "LAG assigned port" field belong to the LAG 18 having the common group number.

Also in this case, in the same manner, in the case of transmitting, from the port belonging to one of the LAGs 18a to 18x, the network frame received by each of the IFSs 14a to 14x, the frame transfer processor 54 of the each of the IFSs 14a to 14x references the LAG setting table 56b to decide the port number (associated FS number) for the transmission based on the value calculated in accordance with the predetermined algorithm.

(Summary of Operation Example 2)

In this manner, even in the case where each of the FSs 16a to 16h and each of the IFSs 14a to 14x are connected to each other by a plurality of ports (physical lines), each of the FSs 16a to 16h can automatically set each of the LAGs 20a to 20x for each pair of ports connected to each of the IFSs 14a to 14x. The administrator of the network no longer needs to manually set the LAGs 20a to 20x for the respective FSs 16a to 16h, which can reduce a workload imposed thereon. Further, also when the configuration of the network relay system 10 is changed, when a failure occurs within the network relay system 10, and when the network relay system 10 recovers from the failure, by receiving the setting frames 66 from the respective IFSs 14a to 14x, the respective FSs 16a to 16h can automatically reset the LAGs 20a to 20x for the above-mentioned ports.

What is claimed is:

1. A network relay system, comprising:
   a plurality of interface switches; and
   a plurality of fabric switches connected to the plurality of interface switches,
   wherein each of the plurality of fabric switches comprises a first setting frame transmitter which transmits a first setting frame that includes first identification information to the plurality of interface switches, and wherein the first identification information is uniquely assigned to the plurality of fabric switches on an individual basis and is automatically sortable in accordance with a predetermined criterion; and
   wherein each of the plurality of interface switches comprises a first LAG setter which automatically sets a link aggregation group for ports that have received the first setting frames, in accordance with an order of arrangement based on the first identification information.

2. The network relay system according to claim 1, wherein the first setting frame transmitter transmits the first setting frame that includes a device number previously assigned to each of the plurality of fabric switches as the first identification information.

3. The network relay system according to claim 1, wherein each of the plurality of interface switches further comprises a second setting frame transmitter which transmits a second setting frame that includes second identification information to the plurality of fabric switches, and wherein the second identification information is uniquely assigned to the plurality of interface switches on an individual basis; and
   wherein each of the plurality of fabric switches further comprises a second LAG setter which automatically sets a link aggregation group for ports that have received the second setting frames that include the same second identification information.

4. The network relay system according to claim 3, wherein the first setting frame transmitter transmits the first setting frame that includes a device number previously assigned to each of the plurality of fabric switches as the first identification information.

5. A method of automatically setting a network relay system, the network relay system comprising: a plurality of interface switches; and a plurality of fabric switches connected to the plurality of interface switches, the method comprising:
   transmitting, by each of the plurality of fabric switches, a first setting frame that includes first identification information to the plurality of interface switches, wherein the first identification information is uniquely assigned to the plurality of fabric switches on an individual basis and is automatically sortable in accordance with a predetermined criterion; and
   automatically setting, by each of the plurality of interface switches, a link aggregation group for ports that have received the first setting frames, in accordance with an order of arrangement based on the first identification information.

6. The method of automatically setting a network relay system according to claim 5, further comprising transmitting, by the each of the plurality of fabric switches, the first setting frame that includes a device number previously assigned to the each of the plurality of fabric switches as the first identification information.

7. The method of automatically setting a network relay system according to claim 5, further comprising:
   transmitting, by each of the plurality of interface switches, a second setting frame that includes second identification information to the plurality of fabric switches, wherein the second identification information is uniquely assigned to the plurality of interface switches on an individual basis; and
   automatically setting, by each of the plurality of fabric switches, a link aggregation group for ports that have received the second setting frames that include the same second identification information.

8. The method of automatically setting a network relay system according to claim 7, further comprising transmitting, by the each of the plurality of fabric switches, the first setting frame that includes a device number previously assigned to the each of the plurality of fabric switches as the first identification information.

* * * * *